(12) United States Patent
Gotoda et al.

(10) Patent No.: US 9,481,361 B2
(45) Date of Patent: Nov. 1, 2016

(54) CONTROL APPARATUS FOR A VEHICLE

(71) Applicants: Kenji Gotoda, Mishima (JP); Koji Hayashi, Nagakute (JP); Koki Ueno, Toyota (JP)

(72) Inventors: Kenji Gotoda, Mishima (JP); Koji Hayashi, Nagakute (JP); Koki Ueno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/007,213

(22) PCT Filed: Jan. 21, 2013

(86) PCT No.: PCT/JP2013/051105
§ 371 (c)(1),
(2) Date: Sep. 24, 2013

(87) PCT Pub. No.: WO2014/112128
PCT Pub. Date: Jul. 24, 2014

(65) Prior Publication Data
US 2015/0307085 A1 Oct. 29, 2015

(51) Int. Cl.
*B60W 20/00* (2016.01)
*B60W 10/06* (2006.01)
(Continued)

(52) U.S. Cl.
CPC .............. *B60W 20/40* (2013.01); *B60K 6/445* (2013.01); *B60W 10/06* (2013.01); *B60W 10/08* (2013.01);
(Continued)

(58) Field of Classification Search
CPC .... B60W 20/40; B60W 10/06; B60W 10/08; B60W 2510/06; B60W 2710/0672; B60W 2710/081; Y10S 903/93

USPC .......................................................... 701/22
See application file for complete search history.

(56) References Cited

U.S. PATENT DOCUMENTS

2007/0049456 A1    3/2007   Shimizu et al.
2007/0234990 A1   10/2007   Shiino et al.
(Continued)

FOREIGN PATENT DOCUMENTS

CN           101298249 A     11/2008
JP      A-2006-029363      2/2006
(Continued)

OTHER PUBLICATIONS

Written Opinion of International Search Authority issued in International Application No. PCT/JP2013/051105 (with translation).
(Continued)

*Primary Examiner* — Khoi Tran
*Assistant Examiner* — Robert Nguyen
(74) *Attorney, Agent, or Firm* — Oliff PLC

(57) ABSTRACT

A control apparatus for a vehicle provided with an engine, an electric motor, and a damper disposed in a power transmitting path between said engine and said electric motor, wherein said engine is started with its speed being raised by a drive force of said electric motor, wherein said damper has characteristics of generating a larger hysteresis torque during its torsion in a negative direction of transmission of the drive force from said electric motor toward said engine, than a hysteresis torque generated during its torsion in a positive direction of transmission of a drive force from said engine toward said electric motor, said control apparatus comprising a hybrid control portion configured to ignite said engine by igniting said engine in the process of a rise of the speed of said engine while said damper is subjected to the torsion in the negative direction by said electric motor.

17 Claims, 7 Drawing Sheets

(51) Int. Cl.
*B60W 10/08* (2006.01)
*B60K 6/445* (2007.10)
*B60K 6/38* (2007.10)

(52) U.S. Cl.
CPC ..... *B60K 2006/381* (2013.01); *B60W 2510/06* (2013.01); *B60W 2710/0672* (2013.01); *B60W 2710/081* (2013.01); *B60Y 2400/48* (2013.01); *Y02T 10/6239* (2013.01); *Y10S 903/93* (2013.01)

(56) References Cited

U.S. PATENT DOCUMENTS

| | | | |
|---|---|---|---|
| 2008/0275624 A1 | 11/2008 | Snyder | |
| 2010/0038158 A1* | 2/2010 | Whitney | B60K 6/365 180/65.265 |
| 2014/0195089 A1* | 7/2014 | Kobayashi | F02N 11/006 701/22 |
| 2014/0296025 A1* | 10/2014 | Fushiki | F02N 11/006 477/3 |
| 2014/0379232 A1* | 12/2014 | Kobayashi | B60K 6/48 701/67 |
| 2015/0080175 A1* | 3/2015 | Kobayashi | B60K 6/48 477/5 |
| 2015/0149009 A1* | 5/2015 | Michikoshi | B60K 6/48 701/22 |
| 2015/0184718 A1* | 7/2015 | Sugiyama | F16F 15/139 464/68.4 |

FOREIGN PATENT DOCUMENTS

| | | |
|---|---|---|
| JP | A-2006-29363 | 2/2006 |
| JP | A-2007-055460 | 3/2007 |
| JP | A-2007-278146 | 10/2007 |
| JP | A-2010-096096 | 4/2010 |
| JP | A-2012-001102 | 1/2012 |

OTHER PUBLICATIONS

Feb. 19, 2013 International Search Report issued in Application No. PCT/JP2013/051105 (with English Translation).
Feb. 19, 2013 Written Opinion issued in Application No. PCT/JP2013/051105 (with English Translation).

* cited by examiner

CONTROL APPARATUS FOR A VEHICLE

TECHNICAL FIELD

The present invention relates to a control apparatus for a vehicle provided with a damper disposed in a power transmitting path between an engine and an electric motor.

BACKGROUND ART

There is well known a vehicle provided with an engine, an electric motor, and a damper provided in a power transmitting path between said engine and said electric motor. Patent Document 1 discloses an example of such a vehicle. This document describes that the damper generates a comparatively large hysteresis torque at least during its torsion in a negative direction in which the damper receives a drive force from drive wheels, and a comparatively small hysteresis torque at least during its torsion in a positive direction in which the damper receives a drive force from the engine. The document also describes that the damper having such characteristics damps an abrupt torque variation during starting of the engine, in a short length of time owing to the comparatively large hysteresis torque during its torsion in the negative direction. The document further describes that the damper effectively damps the torque variation during a steady operation of the engine, owing to the comparatively small hysteresis torque in its torsion in the positive direction.

PRIOR ART DOCUMENT

Patent Document

Patent Document 1: JP-2006-29363A

SUMMARY OF THE INVENTION

Object Achieved by the Invention

By the way, the damper disclosed in Patent Document 1 generates the comparatively large hysteresis torque in addition to the comparatively small hysteresis torque during its torsion in the positive direction. Accordingly, the generation of the comparatively large hysteresis torque during the steady operation of the engine gives rise to a possibility of difficult damping of the torque variation during the steady operation. In this respect, there has been a need of developing a damper which generates only a comparatively small hysteresis torque during its torsion in the positive direction, namely, a damper having characteristics wherein the hysteresis torque is smaller in any range of the torsion in the positive direction than in any range of the torsion in the negative direction. On the other hand, the vehicle disclosed in Patent Document 1 is configured to start the engine by raising the speed of the engine (cranking the engine) with an operation of an electric motor, and then igniting the engine. While the Patent Document 1 discloses that the provision of the above-described damper reduces a shock during the starting of the engine, this document never discloses a relationship between the control of the torque to be generated by the electric motor and the point of time of ignition of the engine during the cranking operation of the engine, and the hysteresis characteristics of the damper. Accordingly, the ignition of the engine to start the engine in a range of the comparatively small hysteresis torque causes difficulty of the hysteresis torque to obtain a sufficient vibration damping effect with respect to a large torque variation caused by the ignition, giving rise to a risk of failure to adequately reduce the engine starting shock. In this connection, it is noted that this problem has not been addressed, and that there has not been a proposal to adequately reduce the engine starting shock, with a damper having the characteristics wherein the hysteresis torque is smaller in any range of the torsion in the positive direction than in any range of the torsion in the negative direction, that is, with a damper having characteristics of generating a larger hysteresis torque during its torsion in the positive direction than the hysteresis torque generated during its torsion in the negative direction.

The present invention was made in view of the background art described above. It is therefore an object of the present invention to provide a control apparatus for a vehicle, which permits adequate reduction of a starting shock of an engine upon starting of the engine by raising its speed with a drive force of an electric motor.

Means for Achieving the Object

The object indicated above is achieved according to a first aspect of the present invention, which provides (a) a control apparatus for a vehicle provided with an engine, an electric motor, and a damper disposed in a power transmitting path between the engine and the electric motor, wherein the engine is started with its speed being raised by a drive force of the electric motor, characterized in that (b) the above-described damper has characteristics of generating a larger hysteresis torque during its torsion in a negative direction of transmission of the drive force from the above-described electric motor toward the above-described engine, than a hysteresis torque generated during its torsion in a positive direction of transmission of a drive force from the above-described engine toward the above-described electric motor, and (c) the above-described engine is started by igniting the engine in the process of a rise of the speed of the engine while the above-described damper is subjected to the torsion in the negative direction by the above-described electric motor.

Advantages of the Invention

The control apparatus described above is configured such that the engine is ignited while the damper is subjected to the torsion by the electric motor in the negative direction, so that the engine is started in the range of generation of the comparatively large hysteresis torque for the damper. Thus, it is possible to reduce the engine starting shock by using the range of generation of the comparatively large hysteresis torque. Accordingly, it is possible to adequately reduce the starting shock of the engine started by raising the engine speed with the drive force of the electric motor.

According to a second aspect of this invention, the control apparatus according to the above-described first aspect of the invention is configured such that the speed of the above-described engine is held raised by the above-described electric motor for a longer length of time or the drive force of the electric motor used to raise the speed of the engine is made larger, when an explosion torque or a friction torque of the above-described engine during its starting is comparatively large than when the explosion torque or the friction torque is comparatively small. According to this second aspect of the invention, the damper is easily subjected to the torsion in the negative direction upon ignition of the engine under the conditions of the engine that tend to increase a torque variation during starting of the engine and the starting shock of the engine. Accordingly, the engine starting shock can be easily reduced. In addition, a secondary explosion shock upon ignition of the engine can be easily and rapidly reduced or damped.

According to a third aspect of the invention, the control apparatus according to the above-described second aspect of the invention is configured such that the speed of the above-described engine is held raised by the above-described electric motor for the longer length of time and the drive force of the electric motor used to raise the speed of the engine is made larger, when both of the explosion torque and the friction torque of the above-described engine during its starting are comparatively large. According to this third aspect of the invention, the damper is easily subjected to the torsion in the negative direction upon ignition of the engine under the conditions of the engine that tend to increase the starting shock of the engine.

According to a fourth aspect of the invention, the control apparatus according to any one of the above-described first through third aspects of the invention is configured such that the above-described engine is started by igniting the engine in the process of the rise of the speed of the engine while the above-described damper is subjected to the torsion in the negative direction by the above-described electric motor, where a time period of an operation of the above-described engine preceding the starting of the engine is comparatively short, a crank position of the above-described engine does not fall within a predetermined angular range, or the above-described engine is in a cool state. According to this fourth aspect of the invention, the damper is more easily subjected to the torsion in the negative direction upon ignition of the engine when the engine is in a cool state than when the engine is in a warmed-up state, when the time period of the operation of the engine preceding the starting of the engine is comparatively short than when the time period is comparatively long, or when the crank position of the engine does not fall within the predetermined angular range than when the crank position falls within the predetermined angular range.

According to a fifth aspect of the invention, the control apparatus according to any one of the above-described first through fourth aspects of the invention is configured such that the speed of the above-described engine is held raised by the above-described electric motor for a longer length of time or the drive force of the electric motor used to raise the speed of the above-described engine is made larger, when an amount of an electric energy stored in an electric-energy storage device provided to supply the electric energy to the above-described electric motor is comparatively large than when the amount of the electric energy is comparatively small. According to this fifth aspect of the invention, the damper is easily subjected to the torsion in the negative direction upon ignition of the engine under the condition that the amount of the electric energy is comparatively larger. Accordingly, the engine starting shock can be easily reduced. In addition, a secondary explosion shock upon ignition of the engine can be easily and rapidly reduced or damped.

According to a sixth aspect of the invention, the control apparatus according to any one of the above-described first through fifth aspects of the invention is configured such that the drive force of the above-described electric motor is temporarily reduced prior to the ignition of the above-described engine. According to this sixth aspect of the invention, the operable range of the electric motor in the process of raising the speed of the engine can be enlarged, and the damper is more easily subjected to the torsion in the negative direction.

According to a seventh aspect of the invention, the control apparatus according to the above-described sixth aspect of the invention is configured such that an amount of temporary reduction of the drive force of the above-described electric motor prior to the ignition of the above-described engine is increased with a decrease of an amount of an electric energy stored in an electric-energy storage device provided to supply the electric energy to the above-described electric motor. According to this seventh aspect of the invention, it is possible to prolong the length of time during which the engine speed is raised by the electric motor, or increase the drive force of the electric motor used to raise the engine speed, even when the amount of the electric energy stored in the electric-energy storage device is comparatively small.

MODE FOR CARRYING OUT THE INVENTION

In one preferred form of the invention, the above-described vehicle is a hybrid vehicle which can be run with an electric motor, which may be a so-called "plug-in" hybrid vehicle having an electric-energy storage device (battery) which can be charged with a charging stand or a domestic electric power source.

In another preferred form of the invention, the above-described vehicle is provided with a power transmitting system having a differential mechanism a differential state of which is controlled with a controlled operation of the above-described electric motor provided as a first electric motor, and which has at least three rotary elements including a rotary element operatively connected to the above-described engine through the above-described damper; a rotary element operatively connected to the first electric motor; and a rotary element in the form of an output rotary member operatively connected to a second electric motor. Alternatively, the above-described vehicle is a vehicle wherein the above-described electric motor is connected to a crankshaft of the above-described engine through the above-described damper, which vehicle may be provided with a clutch configured to selectively place a power transmitting path between the engine and the electric motor in a power transmitting state or a power cut-off state.

In a further preferred form of the invention, the torsion of the above-described damper in the positive direction, which is the torsion caused during transmission of the torque of the above-described engine toward the above-described electric motor through the damper, is equivalent to the torsion caused during transmission of the torque of the above-described electric motor toward the above-described engine through the damper in a direction of stopping the engine (that is, in a direction of lowering the speed of the engine). Preferably, the torsion of the above-described damper in the negative direction is the torsion caused during transmission of the torque of the above-described electric motor toward the above-described engine through the damper in a direction of operating the engine (that is, in a direction of raising the speed of the engine).

An embodiment of the present invention will be described in detail by reference to the drawings.

Embodiment

Figure 1:
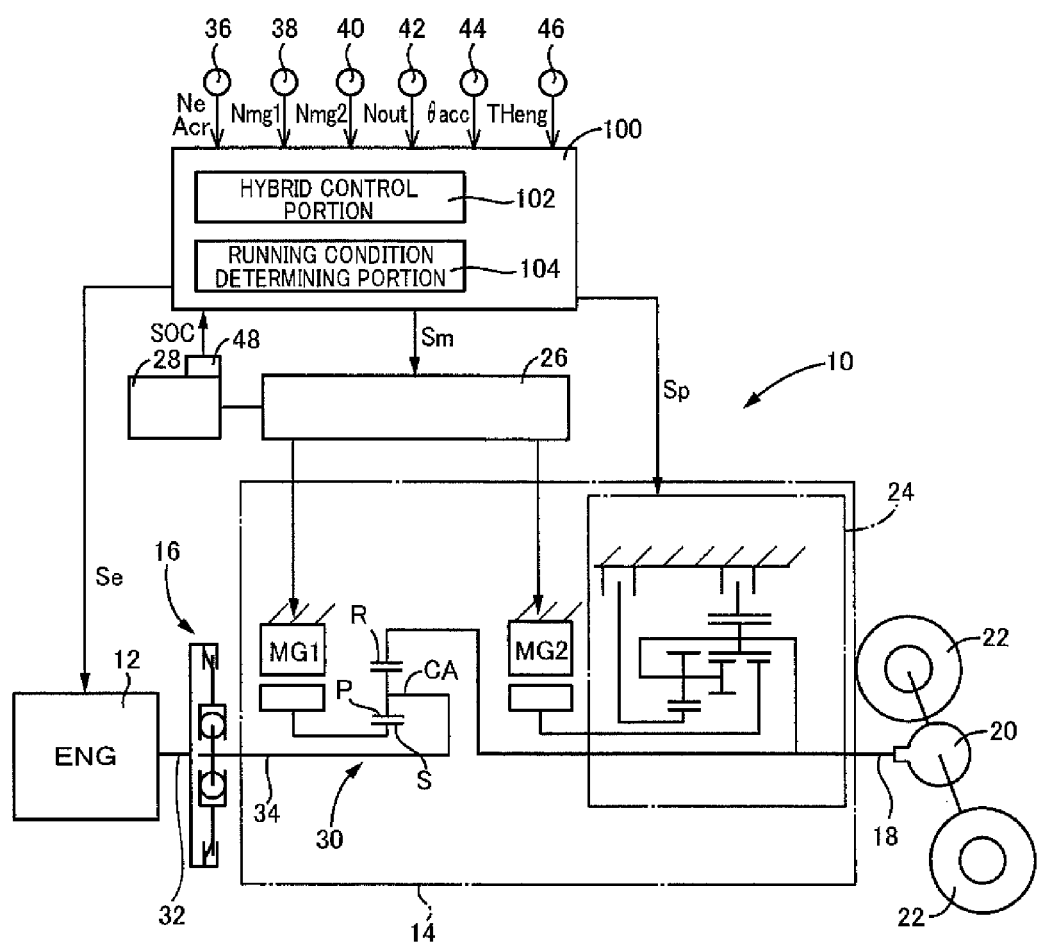
FIG. 1 is a schematic view for explaining an arrangement of a vehicle to which the present invention is applicable, and for explaining major portions of a control system for the vehicle.

FIG. 1 is the schematic view for explaining an arrangement of a vehicle 10 to which the present invention is applicable, and for explaining major portions of a control system for controlling the vehicle 10. The vehicle 10 is a hybrid vehicle provided with an engine 12, a power transmitting system 14, and a damper 16 disposed in a power transmitting path between the engine 12 and the power transmitting system 14, as shown in FIG. 1. In this vehicle 10, a drive force of a main drive power source in the form of the engine 12 is transmitted to the power transmitting system 14 through the damper 16, and is transmitted from a wheel-side output shaft 18 to a pair of left and right drive wheels 22 through a differential gear device 20. The vehicle 10 is provided with a second electric motor MG2 operable to selectively perform a vehicle driving operation to generate a vehicle drive force, or a regenerative operation to generate an electric energy. This second electric motor MG2 is connected to the wheel-side output shaft 18 through an automatic transmission 24. Accordingly, an output torque of the second electric motor MG2 to be transmitted to the wheel-side output shaft 18 is increased or reduced according to a speed ratio (gear ratio) γs of the automatic transmission 24 (=operating speed Nmg2 of the second electric motor MG2/rotating speed Nout of the wheel-side output shaft 18).

The power transmitting system 14 is provided with a first electric motor MG1 and the second electric motor MG2, and is configured to transmit a drive force of the engine 12 to the drive wheels 22. The engine 12 is a known internal combustion engine such as a gasoline engine or a diesel engine, which generates a drive force by combustion of a fuel. An electronic control device 100 which is principally constituted by a microcomputer is provided to electrically control operating states of the engine 12 such as an opening angle of a throttle valve, an intake air quantity, an amount of supply of a fuel, and an ignition timing.

The first electric motor MG1 is a synchronous electric motor, for instance, and selectively performs a function of an electric motor to convert an electric energy into a mechanical drive force (a drive torque, for example), or a function of an electric generator to convert a mechanical energy into an electric energy. The first electric motor MG1 is connected to an electric-energy storage device 28 such as a battery or a capacitor through an inverter 26. The first electric motor MG1 is controlled through the inverter 26 under the control of the electronic control device 100, so as to regulate or set its output torque, namely, an MG1 torque Tmg1 (which may be a regenerative torque). The vehicle 10 is provided with the first electric motor MG1, together with the damper 16 disposed in a power transmitting path between the engine 12 and the first electric motor MG1. The second electric motor MG2 is controlled through the inverter 26 under the control of the electronic control device 100, so as to function as the electric motor or the electric generator, and so as to regulate or set its output torque, namely, an MG2 torque Tmg2 (which may be a regenerative torque).

A planetary gear set 30 is provided as a planetary gear mechanism of a single-pinion type which performs a known differential function and which has three rotary elements in the form of a sun gear S, a ring gear R disposed coaxially with the sun gear S, and a carrier CA supporting a pinion gear P meshing with those sun gear S and ring gear R such that the pinion gear P is rotatable about its axis and about an axis of the planetary gear set 30. This planetary gear set 30 is disposed coaxially with the engine 12 and the automatic transmission 24. Since the planetary gear set 30 and the automatic transmission 24 are symmetrical in construction with respect to their axes, lower halves of the planetary gear set 30 and automatic transmission 24 are not shown in FIG. 1.

A crankshaft 32 of the engine 12 is connected to the carrier CA of the planetary gear set 30 through the damper 16 and a power transmitting shaft 34. On the other hand, the first electric motor MG1 is connected to the sun gear S, while the wheel-side output shaft 18 is connected to the ring gear R. The carrier CA functions as an input element, and the sun gear S functions as a reaction element, while the ring gear R functions as an output element.

In the planetary gear set 30, the output torque of the engine 12 transmitted to the carrier CA causes a reaction torque of the first electric motor MG1 to be transmitted to the sun gear S, and causes the output element in the form of the ring gear R to receive a torque directly transmitted thereto, whereby the first electric motor MG1 functions as the electric motor. While the rotating speed of the ring gear R, that is, the rotating speed Nout of the wheel-side output shaft 18 (output shaft speed Nout) is held constant, an operating speed Ne of the engine 12 (engine speed Ne) can be varied continuously (without a stepping change) by raising or lowering an operating speed Nmg1 of the first electric motor MG1.

Figure 2:
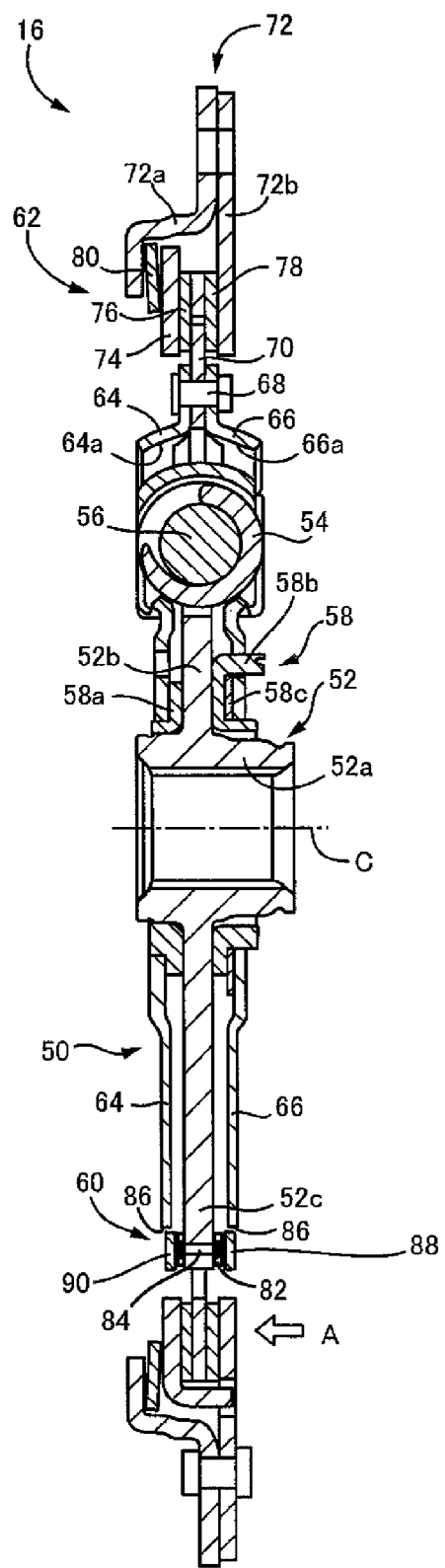
FIG. 2 is a cross sectional view for explaining in detail a construction of a damper device shown in FIG. 1.

FIG. 2 is the cross sectional view for explaining in detail the construction of the damper 16 shown in FIG. 1. The damper 16 is disposed rotatably about an axis C and operatively connected between the engine 12 and the planetary gear set 30. The power transmitting shaft 34 is splined to a radially inner portion of the damper 16. Since the first electric motor MG1 is operatively connected to the damper 16 through the planetary gear set 30, the damper 16 is disposed in a power transmitting path between the engine 12 and the first electric motor MG1.

The damper 16 includes: a pair of disc plates 50 rotatable about the axis C; a hub 52 rotatable about the axis C relative to the disc plates 50; coil springs 54 formed of a spring steel, which are interposed between the disc plates 50 and the hub 52 and which operatively connect the disc plates 50 and the hub 52 to each other; cushions 56 disposed within the respective coil springs 54; a first hysteresis mechanism 58 configured to generate a comparatively small hysteresis torque H1 between the disc plates 50 and the hub 52; a second hysteresis mechanism 60 disposed radially outwardly of the hub 52 and configured to generate a hysteresis torque H2 larger than the small hysteresis torque H1, between the disc plates 50 and the hub 52; and a torque limiter mechanism 62 disposed radially outwardly of the disc plates 50. The first hysteresis mechanism 58 and the second hysteresis mechanism 60 constitute a hysteresis mechanism of the damper 16.

The disc plates 50 consist of a pair of left and right discs in the form of a first disc plate 64 (hereinafter referred to as "first plate 64") and a second disc plate 66 (hereinafter referred to as "second plate 66") which are connected to each other at their radially outer portions by rivets 68 such that the coil springs 54 and the hub 52 are sandwiched between the first and second plates 64, 66 in the axial direction. The rivets 68 also function as a fixing member to fix a lining plate 70 which is a component of the torque limiter mechanism 62. The first plate 64 has a plurality of first openings 64a formed so as to extend in its circumferential direction and accommodating the respective coil springs 54. The second plate 66 has a plurality of second openings 66a formed so as to extend in its circumferential direction and accommodating the respective coil springs 54. The second openings 66a are formed at the same circumferential positions as the corresponding first openings 64a. The first openings 64a and the second openings 66a cooperate to define spaces accommodating the respective coil springs 54 such that the coil springs 54 are equiangularly spaced apart from each other. When the disc plates 50 are rotated about the axis C, the coil springs 54 are rotated about the axis C. The cylindrical cushion 56 is disposed within each of the coil springs 54.

The hub 52 is constituted by: a cylindrical portion 52a having internal teeth on an inner circumferential portion thereof splined to the power transmitting shaft 34; a flange portion 52b in the form of a disc extending radially outwardly from the outer circumferential surface of the cylindrical portion 52a; and a plurality of projections 52c extending radially outwardly from the flange portion 52b. The coil springs 54 are accommodated in the respective spaces each formed between the projections 52c adjacent to each other in the direction of rotation of the hub 52. Accordingly, a rotary motion of the hub 52 about the axis C causes rotary motions of the coil springs 54 about the axis C. In this arrangement, the coil springs 54 are elastically deformed according to an amount of relative rotation of the disc plates 50 and the hub 52, so that a drive force is transmitted by the coil springs 54 between the disc plates 50 and the hub 52. For instance, a rotary motion of the disc plates 50 causes each of the coil springs 54 to be pressed at its one end by the disc plates 50 and at the other end by one of the projections 52c of the hub 52. At this time, the coil springs 54 transmitting the drive force while being elastically deformed absorb a shock due to an input torque variation.

The first hysteresis mechanism 58 is disposed racially inwardly of the coil springs 54, and between the disc plates 50 and the hub 52 in the axial direction. The first hysteresis mechanism 58 includes a first member 58a interposed between the first plate 64 and the flange portion 52b, a second member 58b interposed between the second plate 66 and the flange portion 52b, and a coned-disc spring 58c interposed in a pre-loaded state between the second member 58b and the second plate 66 and biasing the second member 58b against the flange portion 52b. A portion of the first member 58a is held in engagement with a cutout formed through the first plate 64, so that the first member 58a and the first plate 64 are prevented from being rotated relative to each other. A portion of the second member 58b is held in engagement with a cutout formed through the second plate 66, so that the second member 58b and the second plate 66 are prevented from being rotated relative to each other. In the first hysteresis mechanism 58 constructed as described above, a relative sliding movement of the hub 52 and the disc plates 50 takes place with generation of friction forces between the flange portion 52b and the first and second plates 64, 66, so that a hysteresis torque is generated. Namely, the first hysteresis mechanism 58 is configured to generate the comparatively small hysteresis torque H1 in both of positive and negative ranges of the torsion angle. This comparatively small hysteresis torque H1 is advantageous for damping torsional vibrations of a comparatively small amplitude which are generated during an idling operation and a steady operation of the engine. However, the comparatively small hysteresis torque H1 does not permit a sufficiently high damping effect with respect to a torque variation during starting of the engine 12 (that is, a large torque variation caused by combustion or explosion of the engine 12 upon starting of the engine 12), for example.

The torque limiter mechanism 62 is disposed radially outwardly of the disc plates 50, and has a function of preventing transmission of a torque exceeding a predetermined upper limit Tlm. The torque limiter mechanism 62 includes: an annular disc-shaped lining plate 70 fixed to the disc plates 50 by the rivets 68 so that the lining plate 70 is rotated together with the disc plates 50; a radially outer support plate 72 rotatable about the axis C; an annular disc-shaped pressure plate 74 disposed radially inwardly of the support plate 72 and rotatable about the axis C; a first friction member 76 interposed between the pressure plate 74 and the lining plate 70; a second friction member 78 interposed between the lining plate 70 and the support plate 72; and a coned-disc spring 80 interposed in a pre-loaded state between the pressure plate 74 and the support plate 72.

The support plate 72 consists of an annular first support plate 72a and a disc-shaped second support plate 72b. These first and second support plates 72a, 72b have respective holes used for fastening bolts (not shown) formed in their radially outer portions, through which bolts are inserted to fix the support plates 72a, 72b to a flywheel not shown. The first support plate 72a has a radially inner cylindrical portion bent in the axial direction which cooperates with the second support plate 72b to define a space in which the coned-disc spring 80, pressure plate 74, first friction member 76, lining plate 70 and second friction member 78 are accommodated in the order of description in the axial direction from the first support plate 72a toward the second support plate 72b.

The lining plate 70 is an annular disc-shaped member fixed at a radially inner portion thereof to the first plate 64 and the second plate 66 by the rivets 68. Similarly, the pressure plate 74 is an annular disc-shaped member. Between these pressure plate 74 and lining plate 70, there is interposed the first friction member 76, which is an annular disc-shaped member, for example. However, the first friction member 76 may consist of a plurality of arcuate members (pieces) which are equiangularly arranged in a spaced-apart relation with each other in the circumferential direction. While the first friction member 76 is bonded to the lining plate 70 in the present embodiment, the first friction member 76 may be bonded to the pressure plate 74.

Between a radially inner portion of the second support plate 72b and the lining plate 70, there is interposed the second friction member 78, which is an annular disc-shaped member like the first friction member 76, for example. However, the second friction member 78 may consist of a plurality of arcuate members (pieces) which are equiangularly arranged in a spaced-apart relation with each other in the circumferential direction. While the second friction member 78 is bonded to the lining plate 70 in the present embodiment, the second friction member 78 may be bonded to the second support plate 72b.

The coned-disc spring 80 is interposed in a pre-loaded state between the first support plate 72a and the pressure plate 74. The coned-disc spring 80 takes the form of a cone, and is held at its radially inner end in abutting contact with the pressure plate 74, and at its radially outer end in abutting contact with the first support plate 72a, such that the coned-disc spring 80 is elastically deformed or deflected to in the above-indicated pre-loaded state (so as to generate a predetermined preload W). Accordingly, the coned-disc spring 80 biases the pressure plate 74 against the lining plate 70 with the pre-load W in the axial direction. The upper limit Tlm is set to be a predetermined value by suitably adjusting friction coefficients μ of mutually contacting friction surfaces of the pressure plate 74 and the first friction member 76 and mutually contacting friction surfaces of the second support plate 72b and the second friction member 78, operating radii r of the friction members 76, 78 and the preload W of the coned-disc spring 80. When the torque limiter mechanism 62 receives a torque exceeding the upper limit Tlm, the pressure plate 74 and the first friction member 76 slip on their contacting friction surfaces, while the second support plate 72b and the second friction member 78 slip on their contacting friction surfaces, so that the torque limiter mechanism 62 prevents transmission of the torque exceeding the upper limit Tlm therethough.

Figure 3:
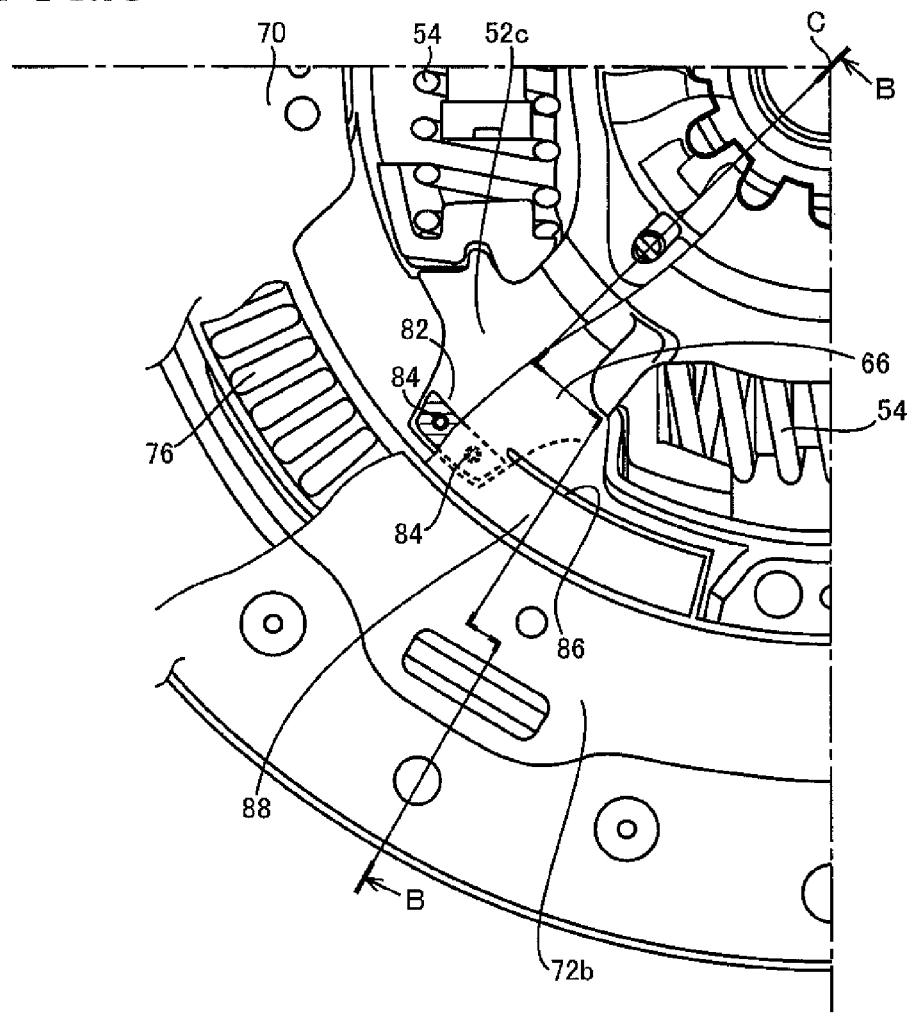
FIG. 3 is a part of a view of the damper device of FIG. 2 as seen in a direction of an arrow A in FIG. 2.

The second hysteresis mechanism 60 is disposed radially outwardly of the hub 52 and the disc plates 50 and is configured to generate a sliding resistance (friction force) between the hub 52 and the disc plates 50, for thereby generating the hysteresis torque H2 larger than the comparatively small hysteresis torque H1 to be generated by the first hysteresis mechanism 58. FIG. 3 is a part of the view of the damper 16 of FIG. 2 as seen in the direction of an arrow A in FIG. 2. FIG. 3 is partially cut away to show the interior structure. As shown in FIGS. 2 and 3, friction plates 82 in the form of rectangular members (pieces) formed of a resin material, for example, are fixed by rivets 84 to opposite surfaces of a radially outer portion of each of the projections 52c of the hub 52, which opposite surfaces are substantially parallel to the disc plates 50.

As shown in FIG. 3, the second plate 66 has an L-shaped cutout 86 having a radial portion extending in its radially inward direction from its outer circumference, and a circumferential portion extending in the circumferential direction (direction of rotation) from the radially inner end of the radial portion, so that the second plate 66 is provided with an arcuate cantilever portion 88 which is defined by the L-shaped cutout 86, so as to extend in its direction of rotation. The cantilever portion 88 is located at the same radial position as a portion of the projection 52c at which the friction plates 82 are fixed thereto. Further, the cantilever portion 88 is formed so as to extend in the direction of rotation such that the cantilever portion 88 is inclined at a predetermined gradient angle S toward the surface of the hub 52 (toward the friction plate 82). Accordingly, when the hub 52 and the second plate 66 are rotated relative to each other, the friction plate 82 and the cantilever portion 88 come into sliding contact with each other as the coil springs 54 are compressed. As shown in FIG. 2, the first plate 64 is provided with a cantilever portion 90 (not shown in FIG. 3) identical with that provided in the second plate 66.

Figure 4:
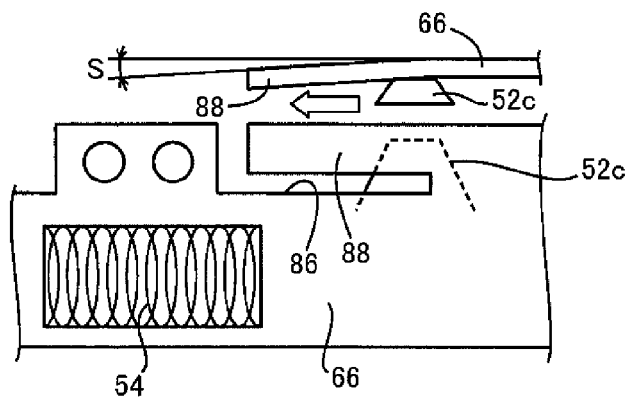
FIG. 4 is a view schematically showing a portion of the damper device of FIG. 3, in particular, an area in which a second plate is provided with a cantilever portion.

FIG. 4 is the view schematically showing a portion of the damper 16 of FIG. 3, in particular, an area in which the second plate 66 is provided with the cantilever portion 88. Although the second plate 66 is actually a disc-shaped member, the second plate 66 is shown linearly in FIG. 4. Accordingly, a rotary motion of the projection 52c of the hub 52 (indicated by broken line) about the axis C is shown in FIG. 4 as a linear motion (left and right direction). An upper part of FIG. 4 is a side view of the cantilever portion 88 and the projection 52c of the lower part of FIG. 4. The friction plates 82 fixed to the projection 52c are not shown in FIG. 4.

As is apparent from the side view portion of FIG. 4, the cantilever portion 88 is inclined at the predetermined gradient angle S, so that a relative rotary movement of the projection 52c (hub 52) and the second plate 66 causes an abutting contact of the projection 52c and the cantilever portion 88 with each other, and a consequent relative sliding movement of the projection 52c and the second plate 66. Described more specifically, a leftward movement of the projection 52c as seen in FIG. 4 relative to the second plate 66 causes the projection 52c and the cantilever portion 88 to come into abutment on each other, due to the inclination of the cantilever portion 88, with a result of a relative sliding movement of the hub 52 and the cantilever portion 88 in pressing contact with each other according to a change of the torsion angle θ. While only the cantilever portion 88 of the second plate 66 is shown in FIGS. 3 and 4, the cantilever portion 90 of the first plate 64 similarly slides on the hub 52.

Thus, the relative sliding movement of the projection 52c and the cantilever portions 88, 90 causes generation of friction forces between the friction plates 82 fixed to the projection 52c and the cantilever portions 88, 90, and consequent generation of the hysteresis torque H2. Namely, the cantilever portions 88, 90 have functions of both of the coned-disc spring and the friction members of the prior art hysteresis mechanism. This hysteresis torque H2 is set to be a predetermined value by adjusting the load acting on each of the friction plates 82 by adjusting thicknesses of the friction plates 82 and the hub 52, a distance between the first and second plates 64, 66, a geometry of the cutouts 86 formed in the first and second plates 64, 66, and the gradient angle S (inclination angle) of the cantilever portions 88, 90 of the first and second plates 64, 66. Further, the second hysteresis mechanism 60 is disposed radially outwardly of the first hysteresis mechanism 58, so that the second hysteresis mechanism 60 can generate the hysteresis torque H2 larger than the comparatively small hysteresis torque H1. The torsion angle θ at which the generation of the hysteresis torque H2 is initiated can be suitably adjusted by adjusting the geometry of the cutouts 86 and the gradient angle S of the cantilever portions 88, 90.

The second hysteresis mechanism 60 according to the present embodiment generates the hysteresis torque H2 when a drive force (which is equivalent to a torque or force, unless otherwise specified) is transmitted through the damper 16 from the first electric motor MG1 toward the engine 12, so as to drive the engine 12 (so as to raise the speed of the engine 12), that is, when the torsion of the damper 16 takes place in the negative direction. Namely, the second hysteresis mechanism 60 is configured such that the friction plates 82 are brought into sliding contact with the cantilever portions 88, 90 when the MG1 torque Tmg1 of the first electric motor MG1 is transmitted through the damper 16 in the direction of operation of the engine 12. When the torsion of the damper 16 takes place in the positive direction as a result of transmission therethrough of a drive force from the engine, on the other hand, the friction plates 82 are not brought into sliding contact with the cantilever portions 88,

90. Namely, the second hysteresis mechanism 60 is configured not to generate the hysteresis torque H2 when the torsion of the damper 16 takes place in the positive direction.

When the hub 52 is rotated in the counterclockwise direction as seen in FIG. 3 (when the projection 52c is moved in the left direction as seen in FIG. 4) as a result of transmission of the torque from the first electric motor MG1 to the engine 12 so as to cause a negative angle of torsion of the damper 16, for example, the cantilever portion 88 and the friction plate 82 come into a relative sliding movement according to a change of the torsion angle θ. Accordingly, the hysteresis torque H2 is generated by the second hysteresis mechanism 60 when the torsion angle of the damper 16 is in the negative range as a result of transmission of the torque from the first electric motor MG1 toward the engine 12 so as to chive the engine 12. When the hub 52 is rotated in the clockwise direction (when the projection 52c is moved in the right direction as seen in FIG. 4) as a result of transmission of the torque from the engine 12 toward the drive wheels 22 so as to cause a positive angle of torsion of the damper 16, on the other hand, the friction plate 82 moves away from the cantilever portion 88, so that the cantilever portion 88 and the friction plate 82 do not come into a relative sliding movement according to a change of the torsion angle θ. Accordingly, the hysteresis torque H2 is not generated by the second hysteresis mechanism 60 when the torsion angle of the damper 16 is in the positive range as a result of transmission of the torque from the engine 12 toward the drive wheels 22.

Figure 5:
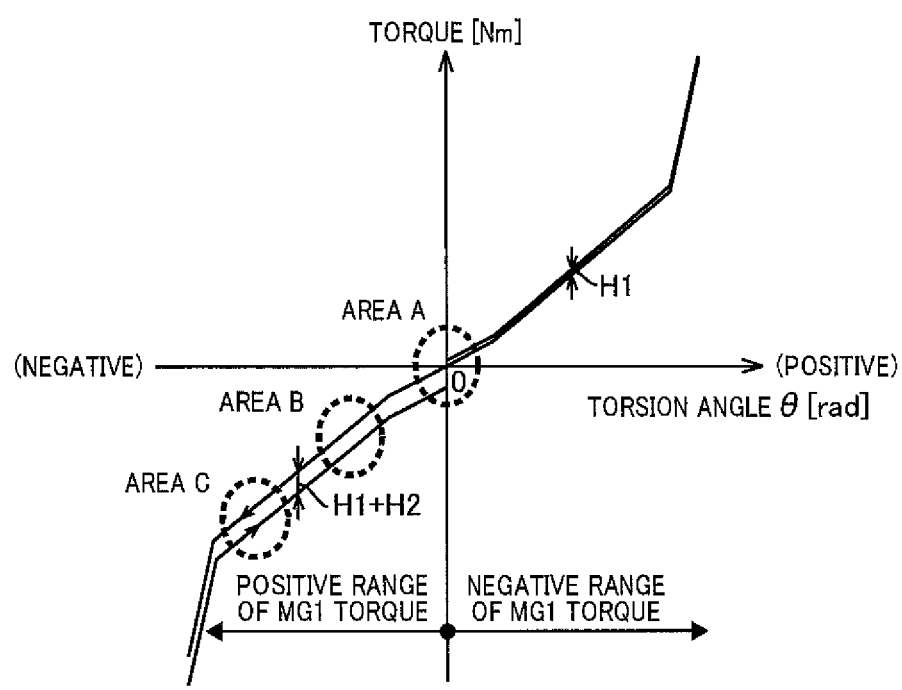
FIG. 5 is a view indicating torsion characteristics of the damper device of FIG. 2.

FIG. 5 is the view indicating torsion characteristics of the damper 16 of the present embodiment. In FIG. 5, the torsion angle θ [rad] of the damper 16 is taken along the horizontal axis, while the torque [Nm] is taken along the vertical axis. As shown in FIG. 5, the first hysteresis mechanism 58 functions to generate the comparatively small hysteresis torque H1 in the positive range of the torsion angle θ [rad], that is, when the torque is transmitted from the engine 12, while in the negative range of the torsion angle θ, that is when the torque is transmitted from the first electric motor MG1 toward the engine 12 not only the first hysteresis mechanism 58 but also the second hysteresis mechanism 60 function to generate a comparatively large hysteresis torque (H1+H2) which is a sum of the comparatively small hysteresis torque H1 and the hysteresis torque H2. As described above, the torsion characteristics of the damper 16 are set such that when the torsion of the damper 16 takes place in the negative direction as a result of transmission of the drive force from the first electric motor MG1 toward the engine 12 so as to drive the engine 12, the damper 16 generates the comparatively large hysteresis torque (H1+H2) which is larger than the comparatively small hysteresis torque H1 generated when the torsion of the damper 16 takes place in the positive direction as a result of transmission of the drive force from the engine 12 toward the first electric motor MG1. This comparatively large hysteresis torque (H1+H2) is advantageous for damping a torque variation during starting of the engine 12, for instance.

In the vehicle 10 according to the present embodiment, a positive torque generated by the first electric motor MG1 is transmitted through the differential function of the planetary gear set 30 to the engine 12 so as to drive the engine 12. Accordingly, the torsion of the damper 16 takes place in the negative direction as a result of generation of the positive torque from the first electric motor MG1, so that the comparatively large hysteresis torque is generated. On the other hand, a negative torque generated by the first electric motor MG1 is transmitted through the differential function of the planetary gear set 30 to the engine 12 so as to stop the engine 12 (so as to lower its speed). Accordingly, the torsion of the damper 16 takes place in the positive direction as a result of generation of the negative torque from the first electric motor MG1, so that the comparatively small hysteresis torque is generated.

Referring back to FIG. 1, the electronic control device 100 includes a so-called microcomputer incorporating a CPU, a RAM, a ROM and an input-output interface. The CPU performs signal processing operations according to programs stored in advance in the ROM while utilizing a temporarily data storage function of the RAM, to implement various controls of the vehicle 10. For instance, the electronic control device 100 is configured to implement output controls of the engine 12, and drive controls of the first electric motor MG1 and the second electric motor MG2, which include a regenerative control. The electronic control device 100 has mutually independent control units such as an engine control unit, an electric motor control unit, a hydraulic control unit and any other control units, as needed. The electronic control device 100 receives output signals of various sensors such as: an output signal of a crank position sensor 36 indicative of an engine speed Ne (operating speed of the engine 12) and a crank position (crank angle) Acr of the engine 12 corresponding to an angular position of the crankshaft 32; an output signal of a first electric motor speed sensor 38 indicative of an MG1 speed Nmg1 (operating speed of the first electric motor MG1); an output signal of a second electric motor speed sensor 40 indicative of an MG2 speed Nmg2 (operating speed of the second electric motor MG2); an output signal of an output shaft speed sensor 42 indicative of an output shaft speed Nout (rotating speed of the wheel-side output shaft 18) corresponding to a running speed V of the vehicle; an output signal of an accelerator pedal operation amount sensor 44 indicative of an operation amount θacc of an accelerator pedal corresponding to a drive force of the vehicle 10 required by the vehicle operator; an output signal of a cooling water temperature sensor 46 indicative of a temperature THeng of a cooling water of the engine 12; and an output signal of a battery sensor 48 indicative of a charging state (stored electric energy amount) SOC of the electric-energy storage device 28. The electronic control device 100 generates various output signals such as: engine output control command signals Se to be applied to engine control devices including a throttle actuator and a fuel injecting device, for controlling the output of the engine 12; electric motor control command signals Sm to be applied to the inverter 26, for controlling the operations of the electric motors MG1 and MG2; and hydraulic control command signals Sp to be applied to a hydraulic control circuit (not shown), for controlling hydraulic actuators of the automatic transmission 24.

Further, the electronic control device 100 has hybrid control means in the form of a hybrid control portion 102, and running condition determining means in the form of a running condition determining portion 104, as major functional portions provided according to the present invention.

The hybrid control portion 102 is configured to calculate a required drive torque Touttgt as a drive force of the vehicle 10 required by the vehicle operator, on the basis of the accelerator pedal operation amount θacc and the vehicle running speed V, and to generate the command signals (engine output control command signals Se and electric motor control command signals Sm) for controlling the drive power sources (engine 12 and second electric motor MG2) to obtain the calculated required drive torque Touttgt, while taking account of the required electric energy charging amount of the electric-energy storage device 28. The hybrid control portion 102 is further configured to selectively establish one of a motor drive mode (EV drive mode), an engine drive mode (steady drive mode) and an engine-assisting drive mode, depending upon the running state of the vehicle. In the motor drive mode, only the second electric motor MG2 is used as the drive power source while the engine 12 is held at rest. In the engine drive mode, at least the engine 12 is used as the drive power source such that the directly transmitted torque of the engine 12 is transmitted to the wheel-side output shaft 18 to drive the drive wheels 22, with the first electric motor MG1 being operated as an electric generator so as to generate a reaction force with respect to the drive force of the engine 12, while the second electric motor MG2 is operated with an electric energy generated by the first electric motor MG1. In the engine-assisting drive mode, the second electric motor MG2 is operated with the electric energy supplied from the electric-energy storage device 28, to produce an assisting torque to assist the engine 12 operated in the engine drive mode. The above-indicated required drive force may be represented by any parameter other than the required drive torque Touttgt [Nm] of the drive wheels 22, for example, by a required drive force [N] of the drive wheels 22, a required drive power [W] of the drive wheels 22, a required output torque of the wheel-side output shaft 18, and a target torque of the drive power sources (engine 12 and second electric motor MG2). The required drive force may also be represented by the accelerator pedal operation amount θacc [%], an opening angle [%] of the throttle valve, or an intake air quantity [g/sec] of the engine 12.

The hybrid control portion 102 establishes the motor drive mode when a point of the running state of the vehicle represented by the actual vehicle running speed V and the required drive force (as represented by the accelerator pedal operation amount θacc or the required drive torque Touttgt, for example) lies in a predetermined motor drive region, or establishes the engine drive mode or the engine-assisting drive mode when the point lies in a predetermined engine drive mode. Even when the point of the vehicle running state lies in the above-indicated motor drive mode, the hybrid control portion 102 operates the engine 12 to drive the vehicle, if the EV driving of the vehicle is not possible due to limitation of consumption of the electric energy stored in the electric-energy storage device 28, if the electric-energy storage device 28 is required to be charged, or if the engine 12 or a device associated with the engine 12 is required to be warmed up. The consumption of the electric energy stored in the electric-energy storage device 28 is limited based on the presently stored electric energy amount SOC and/or a permissible maximum dischargeable electric power, i.e. output restriction, Wout at the present temperature of the electric-energy storage device 28.

The hybrid control portion 102 changes the vehicle drive mode from the motor drive mode to the engine drive mode or engine-assisting drive mode, when the engine 12 is required to be started during the EV driving of the vehicle. In this case, the engine 12 is started to drive the vehicle with the engine 12. To start the engine 12, the hybrid control portion 102 operates the first electric motor MG1 so as to raise the engine speed Ne with a drive force of the first electric motor MG1. That is, the hybrid control portion 102 commands the first electric motor MG1 to generate the MG1 torque Tmg1 (namely, a cranking torque) for raising the engine speed Ne with a rise of the first electric motor speed Nmg1. When the engine speed Ne has been raised to a predetermined value at or above which the engine 12 can be kept operated by itself or can be operated with complete combustion or explosion, the hybrid control portion 102 commands the fuel injecting device to inject a fuel and commands the igniting device to ignite the engine 12 for starting the engine 12.

As described above, the generation of the comparatively large hysteresis torque (H1+H2) by the damper 16 is advantageous than the generation of the comparatively small hysteresis torque H1, for damping the torque variation during starting of the engine 12. In view of this fact, the hybrid control portion 102 commands the igniting device to ignite the engine 12 in the process of rise of the engine speed Ne while the damper 16 is subjected to a torsion in the negative direction by the first electric motor MG1 for starting the engine 12. Namely, the hybrid control portion 102 commands the igniting device to ignite the engine 12 for stating the engine 12, while the first electric motor MG1 is generating the positive MG1 torque Tmg1 (>0).

Figure 6:
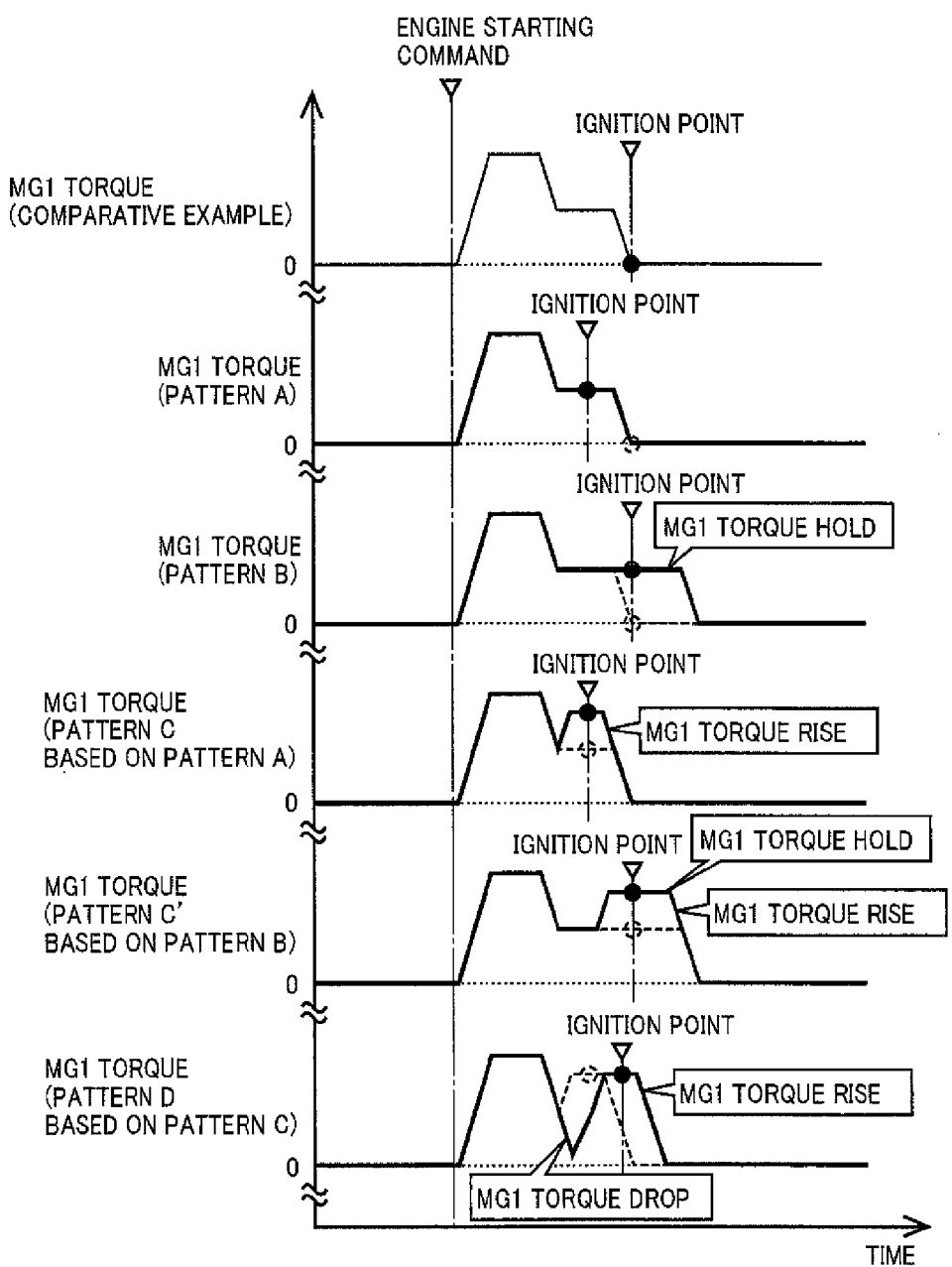
FIG. 6 is a view showing waveforms of an MG1 torque generation command and a point of time of ignition of an engine for its initial explosion, upon starting of the engine.

FIG. 6 is the view showing waveforms of a command for generating the MG1 torque Tmg1 and a point of time of ignition of the engine 12 for its initial explosion, upon starting of the engine 12 under the control of the hybrid control portion 102. In a comparative example indicated in FIG. 6, the engine 12 is ignited when the MG1 torque Tmg1 has been reduced to zero or almost zero after a rise of the engine speed Ne to a predetermined value or larger. Accordingly, the hysteresis torque generated at the initial explosion of the engine 12 falls in a range of the comparatively small hysteresis torque H1 in which it is difficult to obtain a high vibration damping effect, as indicated in an area A in FIG. 5, so that it is difficult to sufficiently damp the engine starting shock. Contrary to the comparative example, Patterns A-D according to the present embodiment use a range of the comparatively large hysteresis torque (H1+H2) upon ignition of the engine 12 (as indicated in areas B and C in FIG. 5), so that it is easy to obtain a high vibration damping effect and possible to adequately damp the engine starting shock.

According to the Pattern A in which the waveform of the MG1 torque Tmg1 is identical with that in the comparative example, the point of time of ignition of the engine 12 is earlier than in the comparative example, so that the engine 12 is ignited while the MG1 torque Tmg1 has a positive value. Accordingly, it is possible to use the range of the comparatively large hysteresis torque (H1+H2) in which it is easy to obtain a high vibration damping effect, as indicated in the area B in FIG. 5 upon initial explosion of the engine 12.

According to the Pattern B in which the point of time of ignition of the engine 12 is identical with that in the comparative example, the MG1 torque Tmg1 is not reduced to zero or almost zero, but is held at a positive value for a longer length of time than in the comparative example, that is, a so-called "MG1 torque hold" is implemented, so that the engine 12 is ignited while the MG1 torque Tmg1 is held at the positive value. Namely, the engine speed Ne is held raised by the first electric motor MG1 for a longer length of time than in the comparative example (or than in the Pattern A). Accordingly, it is not necessary to make the point of time of ignition of the engine 12 earlier than in the comparative example, for using the range of the comparatively large hysteresis torque (H1+H2) upon the initial explosion of the engine 12, as indicated in the area B in FIG. 5, as in the Pattern A. In addition, the Pattern B in which the MG1 torque hold is implemented after the point of time of ignition of the engine 12 for comparatively longer term can maintain the comparative large hysteresis torque (H1+H2) for a longer length of time, permitting easy and rapid reduction or damping of a secondary starting shock of the engine 12.

The Pattern C is a modification of the Pattern A such that the MG1 torque Tmg1 at the point of time of ignition of the engine 12 is made larger than in the Pattern A, that is, a so-called "MG1 torque rise" is implemented. Namely, the drive force of the first electric motor MG1 (MG1 torque, for example) at the point of time of ignition of the engine 12 while the engine speed Ne is raised by the first electric motor MG1 is made larger than in the Pattern A. Accordingly, it is possible to more effectively use (to use for a longer length of time) the range of the comparatively large hysteresis torque (H1+H2) at the initial explosion of the engine 12, as indicated in the area C in FIG. 5.

The Pattern C' is a modification of the Pattern B such that the MG1 torque Tmg1 at the point of time of ignition of the engine 12 is made larger than in the Pattern B. Thus, the MG1 torque hold and the MG1 torque rise are both implemented in the Pattern C'. Accordingly, it is possible to use the range of the comparatively large hysteresis torque (H1+H2) for the longer length of time at the initial explosion of the engine 12, as indicated in the area C in FIG. 5, as well as to enjoy the advantage of the MG1 torque hold.

According to the Pattern D in which the MG1 torque rise is implemented at the point of time of ignition of the engine 12 as in the Pattern C, the MG1 torque is dropped prior to the MG1 torque rise, to a value which is smaller than the value at the point of initiation of the MG1 torque rise in the Pattern C, for the purpose of compensation for an increase of the amount of consumption of the electric power required for the MG1 torque rise. That is, the amount of temporary reduction of the drive force of the first electric motor MG1 (MG1 torque Tmg1, for example) prior to the point of time of ignition of the engine 12 is made larger than in the Pattern C. Thus, the Pattern D implements a so-called "MG1 torque drop" to temporarily reduce the MG1 torque, so that the point of time of ignition of the engine 12 is delayed with respect to that in the Pattern C. The Patterns B and C' may be modified to implement this MG1 torque drop. The MG1 torque drop can compensate for a portion or an entirety of the amount of increase of the consumption of the electric power caused by the MG1 torque rise and/or the MG1 torque hold. In this respect, the MG1 torque drop is advantageous when the stored electric energy amount SOC of the electric-energy storage device 28 is comparatively small, or when the permissible maximum dischargeable electric power Wout is comparatively small.

The Patterns B, C, C' and D provide comparatively high effects of damping the engine starting shock. The Patterns B, C and C' require comparatively large amounts of consumption of the electric power. It is desired to avoid the implementation of the MG1 torque drop as in the Pattern D when the stored electric energy amount SOC of the electric-energy storage device 28 is comparatively large, or when the permissible maximum dischargeable electric power Wout of the electric-energy storage device 28 is comparatively large. In these respects, the Patterns B, C, C' and D are more easily selected when the expected degree of the engine starting shock is comparatively high than when the expected degree is comparatively low. More specifically described, the Patterns B, C and C' are more easily selected when the stored electric energy amount SOC of the electric-energy storage device 28 is comparatively large than when the stored electric energy amount SOC is comparatively small, and/or when the permissible maximum dischargeable electric power Wout of the electric-energy storage device 28 is comparatively large than when the permissible maximum dischargeable electric power Wout is comparatively small. On the other hand, the Pattern D is more easily selected when the stored electric energy amount SOC of the electric-energy storage device 28 is comparatively small, and/or when the permissible maximum dischargeable electric power Wout of the electric-energy storage device 28 is comparatively small. Further, the Pattern A is more easily selected when the stored electric energy amount SOC of the electric-energy storage device 28 is comparatively small, and/or when the permissible maximum dischargeable electric power Wout of the electric-energy storage device 28 is comparatively small, or when the expected degree of the engine starting shock is comparatively low.

The expected degree of the engine starting shock is comparatively high under a condition wherein the explosion torque of the engine 12 during its starting is comparatively large, or under a condition wherein the friction torque of the engine 12 during its starting is comparatively large. If these two conditions are satisfied, that is, when both of the explosion torque and the friction torque of the engine 12 during its starting are comparatively large, the Pattern C' which is considered to provide a highest effect of damping the engine starting shock is selected.

When the engine 12 is in a cool state with a temperature THeng of its cooling water being comparatively low, the engine 12 is started with a larger amount of fuel than when the engine 12 is in a sufficiently warmed-up state, so that the initial explosion force (energy) of the engine 12 tends to be comparatively large, and the explosion torque upon starting of the engine 12 tends to be comparatively large. Where a time period TMst of an operation of the engine 12 preceding the starting of the engine 12, i.e. a time period between previous starting and stopping of the engine 12, is comparatively short, the amount of fuel within the engine cylinders at the starting of the engine 12 tends to be larger than when the time period TMst is comparatively long, so that the explosion torque upon starting of the engine 12 tends to be comparatively large. Where the crank position Acr of the engine 12 upon its starting does not fall within a predetermined angular range, the friction torque of the engine 12 tends to be larger than when the crank position Acr falls within the predetermined angular range. The friction torque of the engine 12 upon its starting (a compression torque corresponding to a pumping loss+a mechanical friction torque corresponding to a sliding resistance) varies depending upon the crank position Acr of the engine 12. Accordingly, an amount of variation of the explosion torque of the engine 12 is comparatively large at the specific crank position Acr in relation to the operating strokes such as the expansion and compression strokes. The hybrid control portion 102 commands the igniting device to ignite the engine 12 for starting the engine 12, in the process of a rise of the engine speed Ne while the damper 16 is subjected to a torsion in the negative direction by the first electric motor MG1, when the engine 12 is in the cool state, when the preceding operation time period TMst is comparatively short, or when the crank position Acr of the engine 12 does not fall within the predetermined angular range. The predetermined angular range of the crank position Acr is an angular range within which the cranking torque is smaller than an upper limit which is predetermined according to an adaptation test, for example.

The running condition determining portion 104 is configured to determine whether an engine starting command requiring the starting of the engine 12 has been generated. For example, the running condition determining portion 104 determines that the engine starting command has been generated, if any one of the following conditions is satisfied: the point of the running state of the vehicle has been moved from the motor drive region into the engine drive region; the EV driving is limited; the electric-energy storage device 28 is required to be charged; and the engine 12 is required to be warmed up. The running condition determining portion 104 also determines whether the electric energy amount stored in the electric-energy storage device 28 is sufficiently large. This determination is made by determining whether the stored electric energy amount SOC or the dischargeable electric power Wout of the electric-energy storage device 28 is sufficient to permit an increase of the amount of consumption of the electric power for starting the engine 12, for example.

The running condition determining portion 104 is further configured to determine whether plurality of conditions that tend to increase the engine starting shock are satisfied. Described more specifically, the running condition determining portion 104 determines whether each of a condition "a", a condition "b" and a condition "c" are satisfied. The condition "a" is satisfied if the cooling water temperature THeng is equal to or lower than a warm-up completion value A [° C.] set in advance at or above which it is considered that the engine 12 has been sufficiently warmed up. The condition "b" is satisfied if the crank position Acr is outside the predetermined angular range between B [°] and B' [°] inclusive. The condition "c" is satisfied if the preceding operation time period TMst of the engine 12 is shorter than a predetermined complete combustion time C [sec] beyond which any amount of the fuel injected for starting the engine 12 is not left in the cylinders of the engine 12, as a result of complete combustion. The running condition determining portion 104 determines that all of the conditions that tend to increase the engine starting shock are satisfied, if all of the above-indicated conditions "a", "b" and "c" are satisfied.

When the running condition determining portion 104 determines that the engine starting command has been generated, and that the amount of the electric power remaining in the electric-energy storage device 28 (the stored electric-energy amount SOC and/or the permissible maximum dischargeable electric power Wout) is not sufficient, the hybrid control portion 102 selects the pattern (Pattern A or D, for example) suitable for a comparatively small amount of consumption of the electric power, to start the engine 12. In this case, the hybrid control portion 102 may be configured to select the Pattern A where the running condition determining portion 104 determines that none of the above-described conditions "a", "b" and "c" is satisfied, and to select the Pattern D where the running condition determining portion 104 determines that at least one of the above-described conditions "a", "b" and "c" is satisfied.

When the running condition determining portion 104 determines that the engine starting command has been generated, and that the amount of the electric power remaining in the electric-energy storage device 28 (the stored electric-energy amount SOC and/or the permissible maximum dischargeable electric power Wout) is sufficient, the hybrid control portion 102 selects the pattern for starting the engine 12, on the basis of the satisfied one or ones of the above-described conditions "a", "b" and "c". Described more specifically, the hybrid control portion 102 selects the pattern (Pattern C') suitable for the highest damping effect of the engine starting shock for starting the engine 12, where the running condition determining portion 104 determines that all of the conditions that tend to increase the engine starting shock are satisfied. The hybrid control portion 102 selects the Pattern A where the running condition determining portion 104 determines that none of the above-described conditions "a", "b" and "c" is satisfied, and selects the Pattern B or C depending on which condition(s) of the above-described conditions "a", "b" and "c" is/are satisfied, where the running condition determining portion 104 determines that one or two of the above-described conditions "a", "b" and "c" is/are satisfied.

Figure 7:
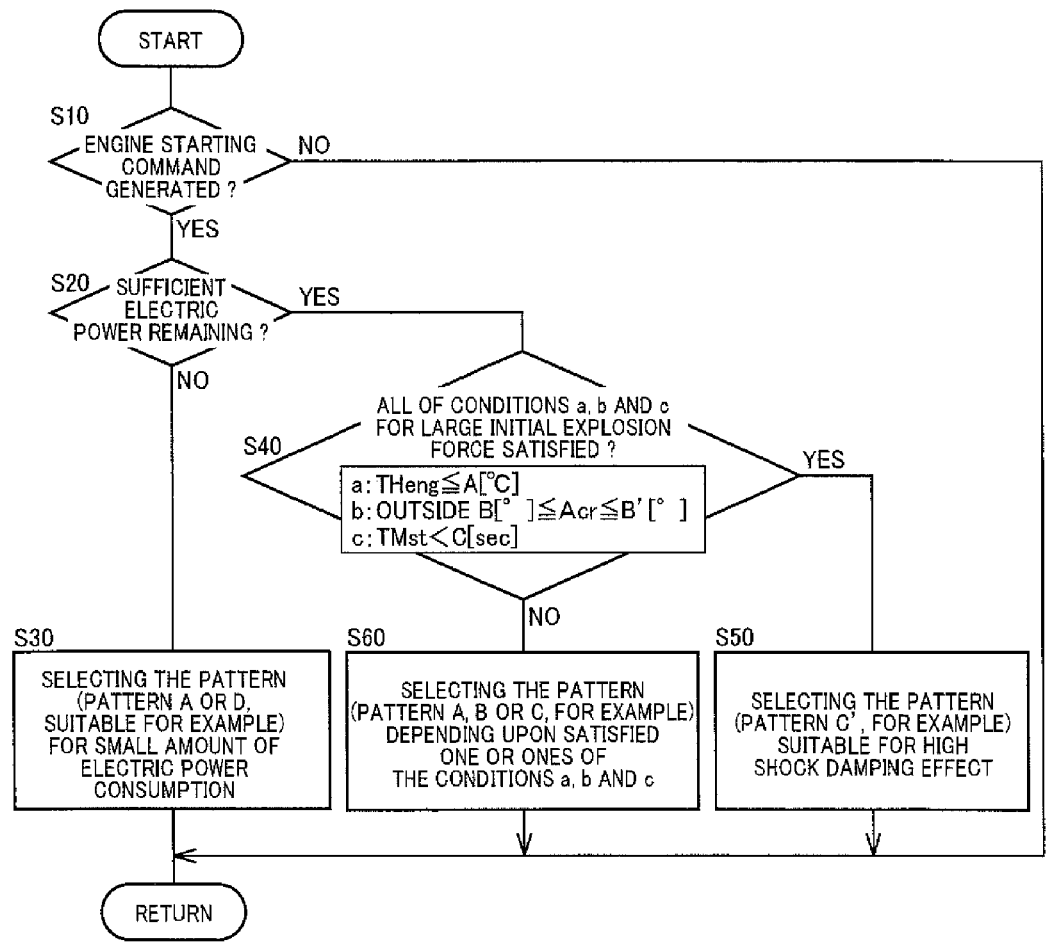
FIG. 7 is a flow chart illustrating a major control operation of an electronic control device, namely, a control operation to start the engine by raising the speed of the engine with a drive force of a first electric motor, so as to adequately reduce a starting shock of the engine.
Figure 8:
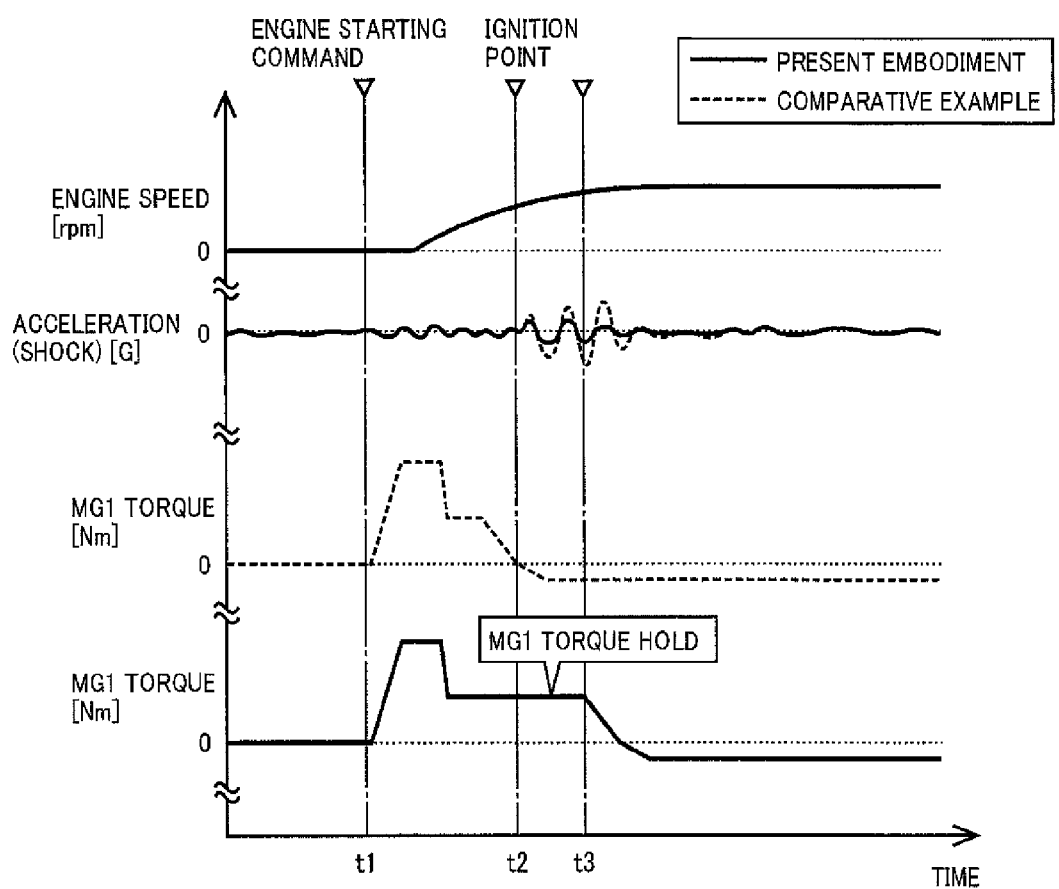
FIG. 8 is a time chart indicating the control operation illustrated in the flow chart of FIG. 7.

FIG. 7 is the flow chart illustrating a major control operation of the electronic control device 100, namely, a control operation to raise the engine speed Ne with a drive force of the first electric motor MG1 to start the engine 12, so as to adequately reduce the engine starting shock. This control operation is repeatedly performed with an extremely short cycle time of several milliseconds to several tens of milliseconds, for example. FIG. 8 is the time chart indicating the control operation illustrated in the flow chart of FIG. 7.

The control operation of FIG. 7 is initiated with step S10 ("step" being hereinafter omitted) corresponding to the running condition determining portion 104, to determine whether the engine starting command has been generated, for example. If a negative determination is obtained in S10, the present control operation is terminated. If an affirmative determination is obtained in S10 (at a point of time t1 in FIG. 8), the control flow goes to S20 corresponding to the running condition determining portion 104, to determine whether the amount of the electric power remaining in the electric-energy storage device 28 is sufficient, for example. If a negative determination is obtained in S20, the control flow goes to S30 corresponding to the hybrid control portion 102, to select the pattern (Pattern A or D, for example) suitable for the comparatively small amount of consumption of the electric power, to start the engine 12. If an affirmative determination is obtained in S20, the control flow goes to S40 corresponding to the running condition determining portion 104, to determine whether all of the conditions "a", "b" and "c" that tend to increase the engine starting shock, for example, are satisfied. If an affirmative determination is obtained in S40, the control flow goes to S50 corresponding to the hybrid control portion 102, to select the pattern (Pattern C', for example) suitable for the highest damping effect of the engine starting shock, to start the engine 12. If a negative determination is obtained in S40, on the other hand, the control flow goes to S60 corresponding to the hybrid control portion 102, to select the pattern (Pattern A, B or C, for example) depending upon the satisfied one or ones of the conditions "a", "b" and "c", to start the engine 12.

In the time chart of FIG. 8, solid lines represent the present embodiment wherein the Pattern B is selected. According to the Pattern B, the length of time during which the engine speed Ne is raised by the first electric motor MG1 is longer than in a Comparative Example represented by broken lines in FIG. 8. In the present embodiment, a point of time (t2) of the engine ignition is the same as in the Comparative Example, but the MG1 torque hold (up to a point of time t3) is implemented. Accordingly, the engine 12 is ignited in the range of generation of the comparatively large hysteresis torque (H1+H2) by the damper 16, in the present embodiment, so that a peak of the torque variation during the engine starting is made lower, and the torque variation is reduced to zero in a shorter length of time, than in the Comparative Example.

As described above, the present embodiment is configured such that the engine 12 is ignited while the damper 16 is subjected to the torsion by the first electric motor MG1 in the negative direction, so that the engine 12 is started in the range of generation of the comparatively large hysteresis torque (H1+H2) in the damper 16. Thus, it is possible to reduce the engine starting shock by using the range of generation of the comparatively large hysteresis torque (H1+H2). Accordingly, it is possible to adequately reduce the starting shock of the engine started by raising the engine speed Ne with the drive force of the first electric motor MG1 (MG1 torque Tmg1, for example).

The present embodiment is further configured such that the MG1 torque hold or the MG1 torque rise is implemented when the explosion torque or friction torque of the engine 12 during its starting is comparatively large, so that the damper 16 is easily subjected to the torsion in the negative direction upon ignition of the engine 12 under a vehicle condition that tends to increase the torque variation during starting of the engine 12 and the starting shock of the engine 12. Accordingly, the engine starting shock can be easily reduced. In addition, a secondary explosion shock upon ignition of the engine 12 can be easily and rapidly reduced or damped.

The present embodiment is also configured such that the MG1 torque hold and the MG1 torque rise are implemented when both of the explosion torque and the friction torque of the engine 12 during its starting are comparatively large. Accordingly, the damper 16 is easily subjected to the torsion in the negative direction upon ignition of the engine 12 under a vehicle condition that tends to increase the starting shock of the engine 12.

The present embodiment is further configured such that the damper 16 is more easily subjected to the torsion in the negative direction upon ignition of the engine 12 when the engine 12 is in a cool state than when the engine 12 is in a warmed-up state, when the time period TMst of the operation of the engine 12 preceding the starting of the engine 12 is comparatively short than when the time period TMst is comparatively long, or when the crank position Acr of the engine 12 does not fall within the predetermined angular range than when the crank position Acr falls within the predetermined angular range.

The present embodiment is also configured such that the MG1 torque hold or the MG1 torque rise is implemented when the stored electric energy amount SOC and/or the permissible maximum dischargeable electric power Wout of the electric-energy storage device 28 is/are comparatively large than when the stored electric energy amount SOC and/or the permissible maximum dischargeable electric power Wout is/are comparatively small. Accordingly, the damper 16 is easily subjected to the torsion in the negative direction upon ignition of the engine 12. Accordingly, the engine starting shock can be easily reduced. In addition, a secondary explosion shock upon ignition of the engine can be easily and rapidly reduced or damped.

The present embodiment is further configured such that the MG1 torque Tmg1 is temporarily reduced prior to the ignition of the engine 12, so that the operable range of the first electric motor MG1 in the process of raising the engine speed Ne can be enlarged, and the damper 16 is more easily subjected to the torsion in the negative direction.

The present embodiment is also configured such that the amount of temporary reduction of the MG1 torque Tmg1 prior to the ignition of the engine 12 is increased with a decrease of the stored electric energy amount SOC and/or the permissible maximum dischargeable electric power Wout of the electric-energy storage device 28. Accordingly, it is possible to implement the MG1 torque hold or the MG1 torque rise, even when the stored electric energy amount SOC and/or the permissible maximum dischargeable electric power Wout is comparatively small.

While the embodiment of the present invention has been described in detail by reference to the drawings, it is to be understood that the invention may be otherwise embodied.

In the vehicle 10 according to the illustrated embodiment, the first electric motor MG1 is connected to the damper 16 and the engine 12 through the planetary gear set 30. However, the engine 12 and the first electric motor MG1 may be connected to each other through a clutch, or directly connected to each other. Namely, the principle of the present invention is applicable to any vehicle in which the damper 16 is disposed in the power transmitting path between the engine 12 and the first electric motor MG1 and in which the engine 12 is started by raising the engine speed Ne with the drive force of the first electric motor MG1.

Although the damper 16 provided in the illustrated embodiment is provided with the first hysteresis mechanism 58 and the second hysteresis mechanism 60 to exhibit the torsion characteristics indicated in FIG. 5, the construction of the hysteresis mechanisms is not limited to the details of the illustrated embodiment, that is, is not particularly limited, as long as the damper 16 is constructed to exhibit the characteristics of torsion as indicated in FIG. 5.

While the comparatively large hysteresis torque is generated over the entire angular range of torsion in the negative direction of the damper 16 in the illustrated embodiment, the comparatively small hysteresis torque may be generated when the angle of torsion of the damper 16 in the negative direction is considerable small.

Although the transmission provided in the illustrated embodiment takes the form of the automatic transmission 24, the construction of the transmission is not limited to the details of the automatic transmission 24, and the transmission may be any other type of transmission such as a multiple-step transmission having a larger number of speed positions, and a continuously-variable transmission of a belt-type. Further, the transmission need not be provided.

While the vehicle 10 according to the illustrated embodiment is provided with the differential mechanism in the form of the planetary gear set 30, the construction of the differential mechanism is not limited to the details of the planetary gear set 30, and the differential mechanism may be a planetary gear set of a double-pinion type, a differential mechanism consisting of a plurality of planetary gear sets connected to each other and having four or more rotary elements, or a differential gear device having a pair of bevel gears meshing with pinions.

While the embodiment of this invention has been described in detail, for illustrative purpose only, it is to be understood that the invention may be embodied with various changes and improvements which may occur to those skilled in the art.

NOMENCLATURE OF REFERENCE SIGNS

10: Vehicle
12: Engine
16: Damper
28: Electric-energy storage device
100: Electronic control device (Control apparatus)
MG1: First electric motor (Electric motor)

The invention claimed is:

1. A control apparatus for a vehicle provided with an engine, an electric motor, and a damper disposed in a power transmitting path between said engine and said electric motor, wherein said engine is started with its speed being raised by a drive force of said electric motor, wherein said damper has characteristics of generating a larger hysteresis torque during its torsion in a negative direction of transmission of the drive force from said electric motor toward said engine, than a hysteresis torque generated during its torsion in a positive direction of transmission of a drive force from said engine toward said electric motor, said control apparatus comprises a hybrid control portion configured to ignite said engine by igniting said engine in the process of a rise of the speed of said engine while said damper is subjected to the torsion in the negative direction by said electric motor, said hybrid control portion holds the speed of said engine raised by said electric motor for a longer length of time or increases the drive force of said electric motor used to raise the speed of said engine, when an explosion torque or a friction torque of said engine during its starting is comparatively large compared to a length of time the speed of said engine is raised by said electric motor or the drive force of said motor used to raise the speed of said engine when said explosion torque or said friction torque is comparatively small, and said hybrid control portion holds the speed of said engine raised by said electric motor for the longer length of time and increases the drive force of said electric motor used to raise the speed of said engine, when both of the explosion torque and the friction torque of said engine during its starting are comparatively large compared to a length of time the speed of said engine is raised by said electric motor or the drive force of said motor used to raise the speed of said engine when said explosion torque or said friction torque is comparatively small.

2. The control apparatus according to claim 1, wherein said hybrid control portion starts said engine by igniting said engine in the process of the rise of the speed of said engine while said damper is subjected to the torsion in the negative direction by said electric motor, where a time period of an operation of said engine preceding the starting of the engine is shorter than a predetermined value, a crank position of said engine does not fall within a predetermined angular range, or said engine is in a cool state.

3. The control apparatus according to claim 1, wherein said hybrid control portion holds the speed of said engine raised by said electric motor for the longer length of time or increases the drive force of said electric motor used to raise the speed of said engine, when an amount of an electric energy stored in an electric-energy storage device provided to supply the electric energy to said electric motor is comparatively large compared to a length of time the speed of said engine is raised by said electric motor or the drive force of said motor used to raise the speed of said engine when said amount of the electric energy is comparatively small.

4. The control apparatus according to claim 1, wherein said hybrid control portion temporarily reduces the drive force of said electric motor prior to the ignition of said engine.

5. The control apparatus according to claim 4, wherein said hybrid control portion increases an amount of temporary reduction of the drive force of said electric motor prior to the ignition of said engine, with a decrease of an amount of an electric energy stored in an electric-energy storage device provided to supply the electric energy to said electric motor.

6. The control apparatus according to claim 1, wherein the hysteresis torque generated by said damper is smaller in any range of the torsion of said damper in the positive direction than in any range of the torsion of said damper in the negative direction.

7. A control apparatus for a vehicle provided with an engine, an electric motor, and a damper disposed in a power transmitting path between said engine and said electric motor, wherein said engine is started with its speed being raised by a drive force of said electric motor, wherein said damper has characteristics of generating a larger hysteresis torque during its torsion in a negative direction of transmission of the drive force from said electric motor toward said engine, than a hysteresis torque generated during its torsion in a positive direction of transmission of a drive force from said engine toward said electric motor, said control apparatus comprises a hybrid control portion configured to ignite said engine by igniting said engine in the process of a rise of the speed of said engine while said damper is subjected to the torsion in the negative direction by said electric motor, and said hybrid control portion holds the speed of said engine raised by said electric motor for a longer length of time or increases the drive force of said electric motor used to raise the speed of said engine, when an amount of an electric energy stored in an electric-energy storage device provided to supply the electric energy to said electric motor is comparatively large compared to a length of time the speed of said engine is raised by said electric motor or the drive force of said motor used to raise the speed of said engine when said amount of the electric energy is comparatively small.

8. The control apparatus according to claim 7, wherein said hybrid control portion holds the speed of said engine raised by said electric motor for the longer length of time or increases the drive force of said electric motor used to raise the speed of said engine, when an explosion torque or a friction torque of said engine during its starting is comparatively large compared to a length of time the speed of said engine is raised by said electric motor or the drive force of said motor used to raise the speed of said engine when said explosion torque or said friction torque is comparatively small.

9. The control apparatus according to claim 8, wherein said hybrid control portion starts said engine by igniting said engine in the process of the rise of the speed of said engine while said damper is subjected to the torsion in the negative direction by said electric motor, where a time period of an operation of said engine preceding the starting of the engine is shorter than a predetermined value, a crank position of said engine does not fall within a predetermined angular range, or said engine is in a cool state.

10. The control apparatus according to claim 8, wherein said hybrid control portion temporarily reduces the drive force of said electric motor prior to the ignition of said engine.

11. The control apparatus according to claim 10, wherein said hybrid control portion increases an amount of temporary reduction of the drive force of said electric motor prior to the ignition of said engine, with a decrease of an amount of an electric energy stored in an electric-energy storage device provided to supply the electric energy to said electric motor.

12. The control apparatus according to claim 8, wherein the hysteresis torque generated by said damper is smaller in any range of the torsion of said damper in the positive direction than in any range of the torsion of said damper in the negative direction.

13. A control apparatus for a vehicle provided with an engine, an electric motor, and a damper disposed in a power transmitting path between said engine and said electric motor, wherein said engine is started with its speed being raised by a drive force of said electric motor, wherein said damper has characteristics of generating a larger hysteresis torque during its torsion in a negative direction of transmission of the drive force from said electric motor toward said engine, than a hysteresis torque generated during its torsion in a positive direction of transmission of a drive force from said engine toward said electric motor, said control apparatus comprises a hybrid control portion configured to ignite said engine by igniting said engine in the process of a rise of the speed of said engine while said damper is subjected to the torsion in the negative direction by said electric motor, and said hybrid control portion temporarily reduces the drive force of said electric motor prior to the ignition of said engine.

14. The control apparatus according to claim 13, wherein said hybrid control portion holds the speed of said engine raised by said electric motor for a longer length of time or increases the drive force of said electric motor used to raise the speed of said engine, when an explosion torque or a friction torque of said engine during its starting is comparatively large compared to a length of time the speed of said engine is raised by said electric motor or the drive force of said motor used to raise the speed of said engine when said explosion torque or said friction torque is comparatively small.

15. The control apparatus according to claim 13, wherein said hybrid control portion starts said engine by igniting said engine in the process of the rise of the speed of said engine while said damper is subjected to the torsion in the negative direction by said electric motor, where a time period of an operation of said engine preceding the starting of the engine is shorter than a predetermined value, a crank position of said engine does not fall within a predetermined angular range, or said engine is in a cool state.

16. The control apparatus according to claim 13, wherein said hybrid control portion increases an amount of temporary reduction of the drive force of said electric motor prior to the ignition of said engine, with a decrease of an amount of an electric energy stored in an electric-energy storage device provided to supply the electric energy to said electric motor.

17. The control apparatus according to claim 13, wherein the hysteresis torque generated by said damper is smaller in any range of the torsion of said damper in the positive direction than in any range of the torsion of said damper in the negative direction.

\* \* \* \* \*